United States Patent [19]

Fazis

[11] Patent Number: 4,535,665
[45] Date of Patent: Aug. 20, 1985

[54] NOTCHING MACHINE

[75] Inventor: Harald Fazis, Weil, Fed. Rep. of Germany

[73] Assignee: Ludwig Boschert GmbH & Co., KG, Lorrach-Hauingen, Fed. Rep. of Germany

[21] Appl. No.: 529,551

[22] Filed: Sep. 6, 1983

[30] Foreign Application Priority Data

Sep. 7, 1982 [DE] Fed. Rep. of Germany ....... 3233208

[51] Int. Cl.³ ............................................. B21D 28/02
[52] U.S. Cl. ...................................... 83/556; 83/559; 83/620; 83/693; 83/917
[58] Field of Search ................ 83/620, 581, 641, 693, 83/696, 917, 556, 559

[56] References Cited

U.S. PATENT DOCUMENTS

| 2,555,069 | 5/1951 | Verney | 83/613 |
| 3,958,482 | 5/1976 | Claesson | 83/620 X |
| 3,996,829 | 12/1976 | Tromponi | 83/917 X |
| 4,327,618 | 5/1982 | Menard | 83/581 |

FOREIGN PATENT DOCUMENTS 2931410 4/1981 Fed. Rep. of Germany .

Primary Examiner—James M. Meister
Attorney, Agent, or Firm—Ratner & Prestia

[57] ABSTRACT

In a notching machine an upper knife is attached by an upper set collar to the head of a vertically moving ram for being turnable around an axis of rotation lying near the nose of the upper knife. The upper set collar is connected through a fixed axis parallel to the axis of rotation with a lower set collar for a common turning around the same axis of rotation. The lower set collar being provided for the attachment of a lower knife and serving as an auxiliary table for workpieces to be notched. The two knives have an equal minimum vertex of, for example, 30° so that with a first working stroke of the ram in a first turning position of the upper and lower set collars and their knives, respectively, this minimum vertex may be notched into the workpieces lying on the auxiliary table and afterwards with a second working stroke of the ram this minimum vertex may be enlarged to any desired larger notching angle up to for example around 120° in a second turning position of the knives.

12 Claims, 3 Drawing Figures

NOTCHING MACHINE

FIELD OF THE INVENTION

This invention relates to a notching machine in which workpieces may be notched with any desired notching angle.

BACKGROUND ART

A prior art notching machine of the kind as herein referred is described in German OS No. 29 31 410, published Apr. 30, 1981. An upper knife is thereby designed as a thin singular blade and directly attached to a vertically moving ram of the machine. A lower knife is formed of two or more singular blades and attached by means of a matrix to a matrix holder of the machine table. Above this matrix holder a guide for the workpieces to be notched is formed of a base plate and a support plate, said guide having adjustable stoppers with which the workpieces are brought into contact for an accurate notching. The support plate, in the cutting path of the upper knife, is provided with a cutting out having an angle of 90° and may be turned on the base plate around an axis of rotation provided near the nose of the knives. By means of this prior notching machine, as a result of two successive working strokes of the ram and an intermediate turning of the guide in the interval from a first resting position adjusted by means of stoppers corresponding to a particularly desired angle into an equally adjusted second resting position, it is accordingly possible to provide notchings in workpieces of any desired size of angle up to a maximum of 90°. For each of the two working strokes, optimum cutting relationships may be established between the cutting edge of the upper blade and the two alternatively cutting actions of the at least two lower blades. However, this prior notching machine has a disadvantage that with a succession of two working strokes of the ram the workpieces are turned together with the guide so that particularly with larger workpieces that regularly project forwardly from the front of the machine table a constant threat of injury is present to the worker standing in front of the machine. With greater angles and a greater rotating mass of the workpieces the adjustable stoppers for the two resting positions of the guide are also correspondingly more demanded so that the notching may become imprecise when the stoppers are not reset in time.

This invention deals with the object of providing a notching machine allowing the notching of workpieces of even larger dimensions with any desired angle also larger than 90° and each carried out by two working strokes of the ram with less danger of injury for the worker. The notching machine shall also allow a simple adjustment for a change over from one to any other desired notching angle.

The advantages obtained from the provision according to this invention of two commonly turnable set collars as attachment means for the upper and lower knives and from the use of the lower set collar as an auxiliary table is mainly to be recognized in the fact that the workpieces now no longer change their relative position with respect to the machine table between every two successive working strokes of the ram needed for each notching of a workpiece. With the turning of the two set collars from a first resting position adjusted to a particularly desired notching angle to an adjusted second resting position the lower set collar passes below the workpieces which preferably are held in contact with table stoppers for an accurate notching. Since the common turning path of these two set collars may easily be changed, any change from one to another desired notching angle may correspondingly be easily carried out. The provision of the upper set collar thereby also offers the possibility to also form the upper knife of two singular blades with a corresponding vertex of 30° in order to be able to notch workpieces with only one working stroke of the ram with an angle of 30° and if desired with two working strokes with an angle up to 120° or more.

DESCRIPTION OF THE PREFERRED EMBODIMENT

Figure 1:
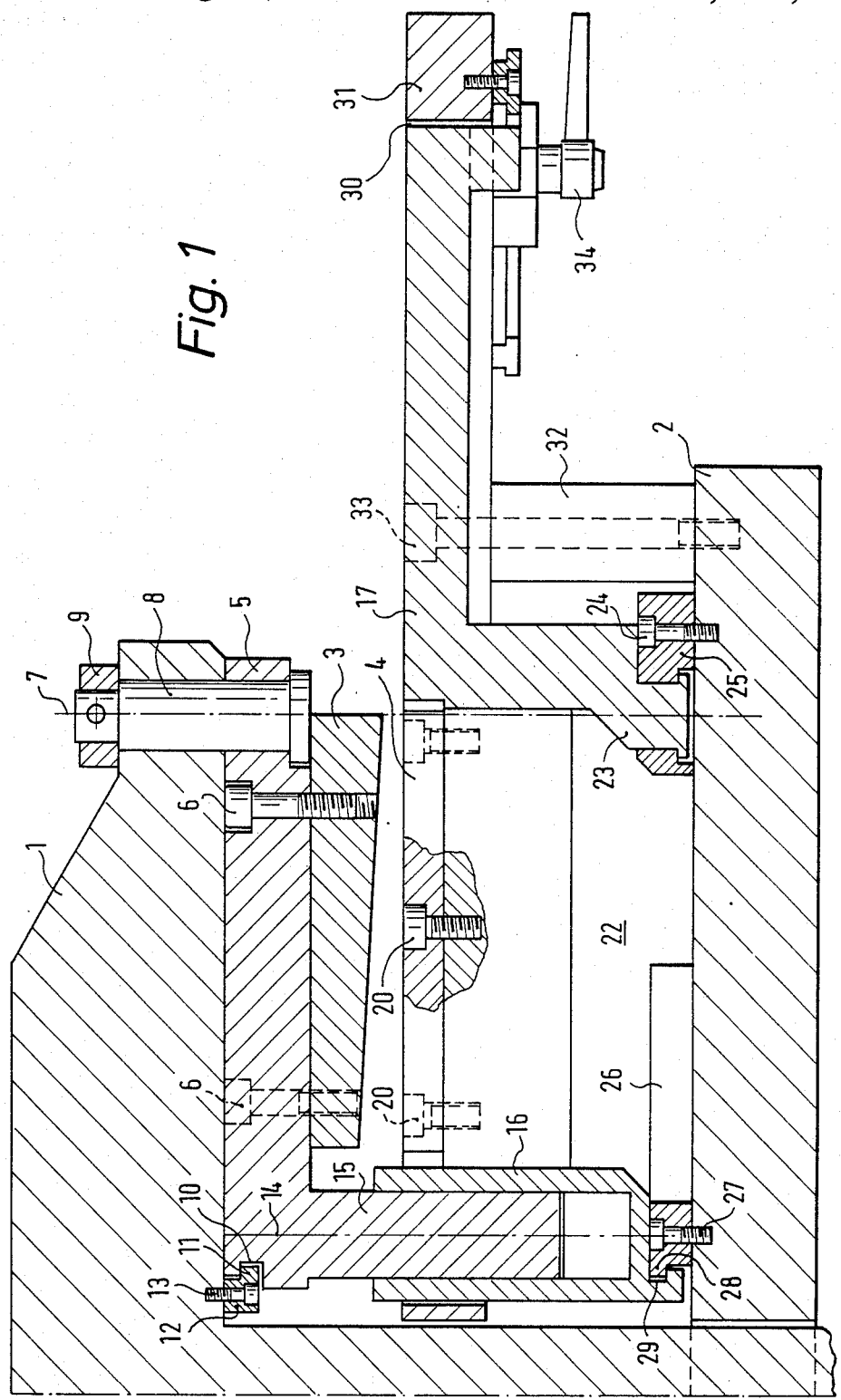
FIG. 1 is a cross-sectional view of the notching machine according to the present invention.
Figure 2:
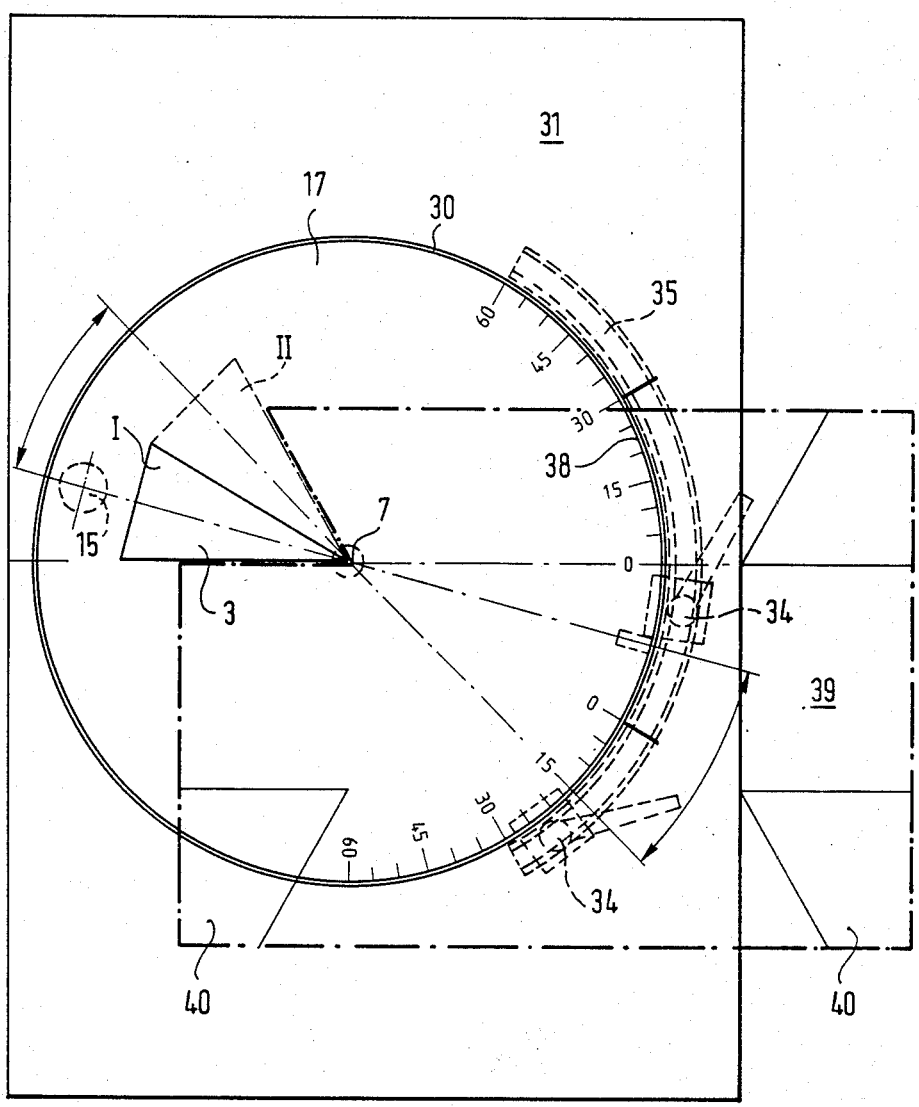
FIG. 2 is a top view of the upper knife of the notching machine according to FIG. 1.
Figure 3:
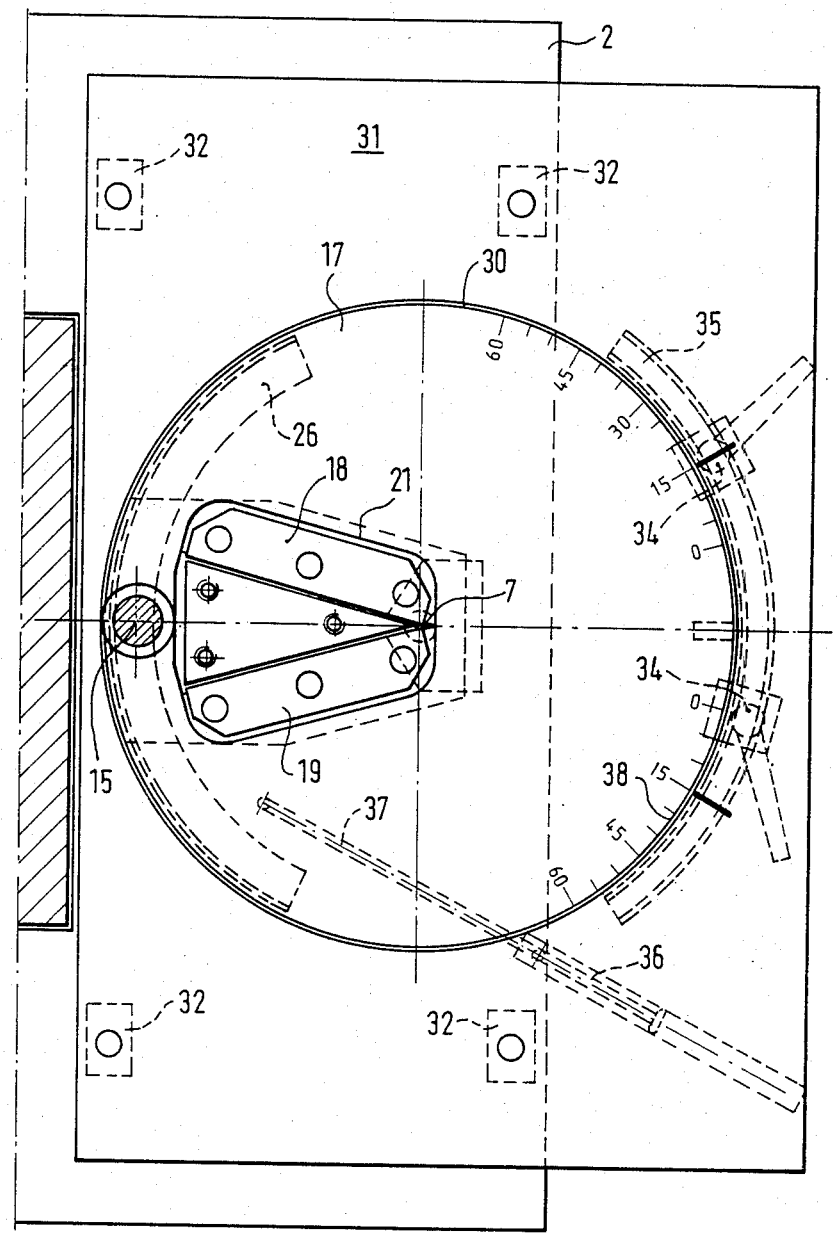
FIG. 3 is a top view of the lower knife of the notching machine according to FIG. 1.

Referring to FIGS. 1-3, the notching machine of this invention may for example be realised with a notching machine as described in U.S. Pat. No. 4,129,054 which on its vertically moving ram is provided with a rearward arm 1 above a rearward machine table 2. The front side of this machine may thusly be used to notch workpieces with a fixed angle of 90° with an upper knife attached to a forward arm of the ram and a lower knife attached to the forward machine table, whereas the rear side of the notching machine remains reserved for notching workpieces with varying angles between 30° and 120°, for example.

The notching machine comprises an upper knife 3 composed of a single unit with a vertex of 30° between its two cutting edges and a lower knife 4 composed of two individual blades with the same vertex. Upper knife 3 is attached to an upper set collar 5 by means of bolts 6. The upper set collar 5 is by itself attached in such a manner to the rearward arm 1 of the ram that it can turn around an axis of rotation 7 provided at the mid-point of the arc of curvature of the rounded nose of the upper knife 3 by means of a pivot 8 and a nut 9 screwed on this pivot.

A guide groove 10 is formed in the upper set collar 5, which groove has a circular curvature concentric to the axis of rotation 7. A projection 11 of a sliding piece 12 projects into the guide groove 10, which piece is fastened by means of screws 13 to the rearward arm 1 of the ram and also is provided with a circular curvature concentric to the axis of rotation 7. The guide groove 10 and the sliding piece 12 provide for the upper set collar 5 a guide length corresponding to a mid-point angle of 150°. The upper set collar 5 has further a guide bolt 15 arranged in a rigid axis 14 parallel to the axis of rotation 7, which guide bolt is inserted into a guide bushing 16 of a lower set collar 17 provided for the attachment of the lower knife 4. The two blades 18 and 19 of the lower knife 4 are arranged within a recess 21 of the lower set collar 17, which recess communicates with an opening 22 by which all wastes can be removed.

The lower set collar 17 comprises a pivot 23 as arranged in the axis of rotation 7 and inserted into a bearing hole of an attachment 25 fastened with bolts 24 to the rearward machine table 2. Lower set collar 17 is supported on the rearward machine table 2 by means of this attachment 25 near the axis of rotation 7 and additionally near the rigid axis 14 by means of a second sliding piece 26. Sliding piece 26 is also fastened by means of bolts 27 to the table 2 and has similar to the first sliding piece 12 a circular curvature concentric to the axis of rotation 7 and with a guide length corresponding to a mid-point angle of 150°. Sliding piece 26 also has a projection 28 which fits into a second guide groove 29 of the lower set collar 17. The two set collars 5 and 17 are connected to each other through the rigid axis 14 and thusly can be turned in common around the axis of rotation 7.

The lower set collar 17 is designed as an auxiliary table arranged in parallel with the rearward machine table 2 within an opening 30 of a stop table 31 arranged plane-parallel with this auxiliary table. The stop table 31 is supported on the rearward machine table 2 by means of four support columns 32 and fastened by means of bolts 33. Stop table 31 is provided with T-grooves not shown for the arrangement of adjustable stoppers for the workpieces which during any notching are held by pressure pads also not shown in the drawing. The lower set collar 17 may be adjustably fastened to the stop table 31 by a locking or T-handle mechanism 34, which includes a guide segment 35 circular and concentric to the axis of rotation 7 with a guide length corresponding also to a mid-point angle of 150°. Further, on the stop table 31 a driving unit in the form of a double acting pressure cylinder 36 for adjustment of the two set collars 5 and 17 is arranged whereby the piston rod 37 of this pressure cylinder is coupled to the lower set collar 17. Instead of such a double acting pressure cylinder the driving unit may also comprise a numerically controlled spindle drive. The two set collars 5 and 17 are provided with an angle scale 38 reaching over 150° whereby two zero marks with a mid-point angle of 30° are provided with respect to the axis of rotation 7. Two halves of the angle scale each comprising 60° are starting at these zero marks for an extension into opposite directions.

If the blades 18 and 19 of the knife 5 are place into the turning position illustrated in FIG. 3, then notches may be produced in cooperation with the upper knife 4 with a predetermined minimum angle of 30°. The workpieces 39 are for this purpose successively laid on the auxiliary table formed by the lower set collar 15 and the stop table 31. If notches with a greater angle up to a maximum of 120°, for example notches 40 with an angle of 60° or 67.5°, shall be produced then the workpieces 39 held in contact with the stoppers of the stop table 31 must first be notched with an angle of 30° by a first working stroke of the ram in a respectively first relative turning position I of the upper knife 3 with which then also corresponds a first turning position of the lower knife 4. Afterwards, the two notching knives must be adjusted into a second turning position II through a common turning of the two set collars 5 and 17 around the axis of rotation 7 by means of the pressure cylinder 36. In this manner, with a second working stroke of the ram the notching angle will then be enlarged to its final value of either 60° or 67.5°, for example.

The fixation of the second turning position II is carried out through a manipulation of the locking or T-handle mechanism 34 by means of which the lower set collar 17 may be released from the stop table 31. After this release of mechanism 34 the lower set collar 17 may be turned together with the upper set collar 5 around the axis of rotation 7 and along the angle scale 38. The angular difference to any greater notching angle than 30° may be read with precision on this angle scale 38 so that the second turning position II may be precisely adjusted with a then repeated use of the mechanism 34. The turning of the two set collars when the locking or T-handle mechanism 34 is released can thereby be effected with or without assistance from the pressure cylinder 36. The two turning positions I and II once set may arbitrarily be fixed by means (not shown) which then also provides the possibility to operate the pressure cylinder 36 in intervals with the working strokes of the ram in such a manner that the two set collars 5 and 17 are automatically adjusted between any two successive working strokes of the ram to either of the two turning positions I and II for a successive notching of the workpieces.

Similar to the lower knife 4, upper knife 3 may be formed of two individually replaceable blades. Both notching knives may also comprise, for example, three triangularly arranged blades to thusly enable the notching of correspondingly polygonal punches with at least two working strokes of the ram.

What is claimed is:

1. A notching machine having a vertically moving ram which is provided with a projecting head serving as a tool holder for an upper knife of a blade assembly which further comprises a lower knife that is attached to a machine table, the upper and the lower knives each being provided at a nose formed by two included cutting edges with an identical fixed minimum vertex, comprising:

an upper set collar for mounting said upper knife to the head of said ram with such an attachment that the upper set collar in common with the upper knife may be turned around a vertical axis of rotation which is in parallel with the longitudinal axis of said ram and extends near the nose of the upper knife;

a lower set collar for mounting said lower knife to the machine table with such an attachment that the lower set collar in common with the lower knife may be turned around said vertical axis of rotation which extends near the nose of the lower knife, said lower set collar further for serving as an auxiliary supporting table for a work piece; and means along an axis parallel to said vertical axis of rotation for rigidly connecting the upper set collar with the lower set collar for a common turning of the two knives about their vertical axis of rotation, wherein a notching of said workpiece with a notching angle greater than said fixed minimum vertex of the two knives is accomplished by two successive working strokes of the ram made at two respectively different turning positions of the upper and lower set collars as successively and simultaneously adjusted relative to the workpiece.

2. A notching machine according to claim 1 in which said lower set collar comprises a pivot arranged in said vertical axis of rotation and inserted into a bearing hole of an attachment as attached to said machine table for supporting said lower set collar.

3. A notching machine according to claim 2 in which a circular guide concentric to said axis of rotation is provided for said rigid connecting means.

4. A notching machine according to claim 3 in which said circular guide comprises at least one sliding piece attached to the head of the vertically moving ram, said sliding piece being provided with a projection projecting into a guide groove of said upper set collar.

5. A notching machine according to claim 1 in which said upper set collar is vertically guided with respect to said lower set collar in parallel to said vertical axis of rotation.

6. A notching machine according to claim 5 in which the rigid connecting means comprises a guide bolt arranged in the parallel axis and inserted into a guide bushing of the lower set collar.

7. A notching machine according to claim 1 in which said lower set collar is supported at said parallel axis by a second sliding piece attached to said machine table.

8. A notching machine according to claim 7 in which said second sliding piece is provided with a circular guide for said lower set collar, said guide being concentric to the vertical axis of rotation.

9. A notching machine according to claim 8 in which said lower set collar comprises a guide groove into which a projection of the second sliding piece fits.

10. A notching machine according to claim 1 in which at least said lower knife comprises two individually replaceable blades.

11. A notching machine according to claim 1 in which said two set collars may commonly be turned by means of a single drive unit.

12. A notching machine according to claim 1 in which said lower set collar is arranged within an opening of a stop table arranged plane-parallel.

* * * * *